(12) United States Patent
Collet Romea et al.

(10) Patent No.: US 11,546,567 B2
(45) Date of Patent: Jan. 3, 2023

(54) MULTIMODAL FOREGROUND BACKGROUND SEGMENTATION

(71) Applicant: Microsoft Technology Licensing, LLC, Redmond, WA (US)

(72) Inventors: Alvaro Collet Romea, Seattle, WA (US); Bao Zhang, Redmond, WA (US); Adam G. Kirk, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/214,027

(22) Filed: Dec. 7, 2018

(65) Prior Publication Data

US 2019/0379873 A1 Dec. 12, 2019

Related U.S. Application Data

(63) Continuation of application No. 13/918,747, filed on Jun. 14, 2013, now abandoned.
(Continued)

(51) Int. Cl.
*G06T 11/60* (2006.01)
*H04N 13/106* (2018.01)
(Continued)

(52) U.S. Cl.
CPC .......... *H04N 13/106* (2018.05); *G01B 11/22* (2013.01); *G06K 9/6293* (2013.01); *G06T 7/11* (2017.01);
(Continued)

(58) Field of Classification Search
CPC .... H04N 13/106; H04N 13/271; H04N 5/272; H04N 9/75; H04N 2013/0081; H04N 5/2226; G01B 11/22; G06K 9/03; G06K 9/38; G06K 9/6293; G06T 2207/10016; G06T 2207/10024; G06T 2207/10028;
(Continued)

(56) References Cited

U.S. PATENT DOCUMENTS

2006/0039690 A1 2/2006 Steinberg et al.
2006/0102843 A1* 5/2006 Bazakos ............ G06K 9/00255
250/339.05

(Continued)

FOREIGN PATENT DOCUMENTS

RU 2421933 C2 6/2011

OTHER PUBLICATIONS

"Office Action Issued In Australian Patent Application No. 2014254218", dated Apr. 11, 2017, 2 Pages.
(Continued)

*Primary Examiner* — Patrick E Demosky

(57) ABSTRACT

The subject disclosure is directed towards a framework that is configured to allow different background-foreground segmentation modalities to contribute towards segmentation. In one aspect, pixels are processed based upon RGB background separation, chroma keying, IR background separation, current depth versus background depth and current depth versus threshold background depth modalities. Each modality may contribute as a factor that the framework combines to determine a probability as to whether a pixel is foreground or background. The probabilities are fed into a global segmentation framework to obtain a segmented image.

20 Claims, 9 Drawing Sheets

Related U.S. Application Data

(60) Provisional application No. 61/812,233, filed on Apr. 15, 2013.

(51) Int. Cl.

| | | |
|---|---|---|
| *H04N 13/271* | (2018.01) | |
| *H04N 5/272* | (2006.01) | |
| *G06K 9/62* | (2022.01) | |
| *H04N 9/75* | (2006.01) | |
| *G06T 7/136* | (2017.01) | |
| *G06T 7/593* | (2017.01) | |
| *G06T 7/174* | (2017.01) | |
| *G06T 7/521* | (2017.01) | |
| *G06T 7/11* | (2017.01) | |
| *G06T 7/194* | (2017.01) | |
| *G06V 10/28* | (2022.01) | |
| *G06V 10/98* | (2022.01) | |
| *G01B 11/22* | (2006.01) | |

(52) U.S. Cl.
CPC .............. *G06T 7/136* (2017.01); *G06T 7/174* (2017.01); *G06T 7/194* (2017.01); *G06T 7/521* (2017.01); *G06T 7/593* (2017.01); *G06T 7/596* (2017.01); *G06V 10/28* (2022.01); *G06V 10/98* (2022.01); *H04N 5/272* (2013.01); *H04N 9/75* (2013.01); *H04N 13/271* (2018.05); *G06T 2207/10016* (2013.01); *G06T 2207/10024* (2013.01); *G06T 2207/10028* (2013.01); *G06T 2207/10048* (2013.01); *G06T 2207/20021* (2013.01)

(58) Field of Classification Search
CPC ........... G06T 2207/10048; G06T 2207/20021; G06T 7/11; G06T 7/143; G06T 7/162; G06T 7/174; G06T 7/194
See application file for complete search history.

(56) References Cited

U.S. PATENT DOCUMENTS

| | | | | |
|---|---|---|---|---|
| 2006/0285747 A1* | 12/2006 | Blake | ................ | G06K 9/00234 382/180 |
| 2007/0237393 A1* | 10/2007 | Zhang | ..................... | G06K 9/38 382/173 |
| 2008/0181507 A1* | 7/2008 | Gope | ..................... | G06T 7/194 382/190 |
| 2011/0282140 A1* | 11/2011 | Itkowitz | ............. | G06K 9/00375 600/109 |
| 2011/0293180 A1* | 12/2011 | Criminisi | ................ | G06K 9/34 382/173 |
| 2012/0306904 A1* | 12/2012 | Francois | ............... | A63F 13/213 345/589 |
| 2013/0084007 A1* | 4/2013 | Salamati | ................. | G06T 7/143 382/173 |
| 2013/0243313 A1* | 9/2013 | Civit | ..................... | G06T 5/002 382/164 |

OTHER PUBLICATIONS

"Notice of Allowance Issued In Russian Patent Application No. 2015143935", dated Apr. 12, 2018, 11 pages.

"Office Action Issued In Russian Patent Application No. 2015143935", dated Dec. 25, 2017, 7 Pages.

"Office Action Issued in Brazilian Patent Application No. BR112015025974-0", dated Mar. 6, 2020, 5 Pages.

"Office Action Issued in Korean Patent Application No. 10-2015-7032616", dated Mar. 25, 2020, 8 Pages.

"Office Action Issued in Korean Patent Application No. 10-2015-7032616", dated Jun. 15, 2020, 8 Pages.

"Office Action Issued in Indian Patent Application No. 6363/CHENP/2015", dated Jun. 28, 2020, 7 Pages.

"Office Action Issued in Canadian Patent Application No. 2,908,689", dated Aug. 31, 2020, 6 Pages.

* cited by examiner

MULTIMODAL FOREGROUND BACKGROUND SEGMENTATION

CROSS-REFERENCE TO RELATED APPLICATION

The present application is a continuation of and claims priority to U.S. patent application Ser. No. 13/918,747, filed Jun. 14, 2013, which claims priority to U.S. provisional patent application Ser. No. 61/812,233, filed Apr. 15, 2013, both of which are incorporated by reference herein.

BACKGROUND

In video processing, segmentation is used to separate foreground objects (e.g., people) from the background. As one example often used in movies and television, segmentation allows video of a foreground person to captured and placed in front of a different background.

One well-known existing segmentation technique is based upon chroma key segmentation (chroma keying), where typically a screen of a known color such as green or sometimes blue is placed in the original background. When a foreground object appears in front of the screen, anything that does not match that screen color is considered foreground; (this is often referred to as "greenscreening" because a green screen is typically used in the background, whereby pixels that are not that shade of green are considered foreground pixels).

Another segmentation technique is based upon background subtraction, where the background is first captured without anything in the foreground, whereby when a foreground object (or objects) is present, the before and after difference is used to remove the background. Recent developments in depth sensing also have resulted in attempts to use depth data to separate foreground objects from a background.

However, while existing solutions provide segmentation in certain situations, they are not particularly robust. Indeed, as scenarios such as multiple camera studios are used to capture three-dimensional point clouds of a foreground object from all viewpoints, these solutions are generally inadequate. For example, chroma key segmentation generally needs very controlled conditions, whereby any change in illumination or background color hinders the performance. Further, chroma keying is limited to situations where a screen can be placed in the background, which is often not practical or possible. Background subtraction has problems in disambiguating areas in which the foreground and background are similar, and areas in which the image is imperfect (e.g., blurry). Depth data is subject to noise, and thus depth-based segmentation is not sufficient in many scenarios.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards a foreground background segmentation framework, including a multimodal segmentation algorithm configured to accept contribution factors from different segmentation modalities. The multimodal segmentation algorithm processes the contribution factors to determine foreground versus background data for each element (e.g., pixel) of an image, whereby the data is useable by a segmentation algorithm to determine whether that element is a foreground or background element.

One or more aspects are directed towards processing a frame of image data, and processing depth data computed from a corresponding depth-related image. Background subtraction is performed on an element of the image data to obtain a background subtraction contribution factor for that element. One or more other depth-based contribution factors may be determined based upon the depth data associated with that element. A combined data term based at least in part upon a contribution from the background subtraction contribution factor and a contribution from each of the one or more other depth-based contribution factors is computed. The data term in conjunction with other data terms as input to a global binary segmentation mechanism to obtain a segmented image.

One or more aspects are directed towards steps selecting a pixel as a selected pixel, and processing pixel data, including processing RGB pixel data of one or more images to determine one or more RGB contributing factors indicative of whether the selected pixel is likely a foreground or background pixel in a current image. Infrared pixel data of one or more infrared images may be processed to determine one or more IR contributing factors, and pixel depth data may be processed to determine one or more depth-based contributing factors. The contributing factors are combined into a data term for the selected pixel, which is maintained for the selected pixel independent of other data terms for any other pixels. The steps are repeated to obtain data terms for a plurality of pixels.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a framework that allows using a combination of image-based factors, depth-based factors, and domain knowledge of a scene to perform foreground/background segmentation. Unlike existing techniques based upon single mode solutions, the framework is configured to exploit different modalities of information to achieve more robust and accurate foreground/background segmentation results relative to existing solutions.

In one aspect, for each frame of a video stream, a red, green and blue (RGB) image, an infrared (IR) image and a depth map for that image may be obtained. The data in the various images may be processed on a per-element (e.g., per-pixel) basis to determine a set of factors. The factors are mathematically combined into a probability value indicative of whether the element, (referred to hereinafter as a "pixel" except where otherwise noted), is in the foreground or the background.

Thus, instead of a single mode solution, a probability function that provides a probability of a given pixel being foreground or background based upon multimodal information. The probability data for the image pixels may be fed into a Global Binary Segmentation algorithm, e.g., graph cuts algorithm, to obtain foreground/background segmentation of an image frame that is highly robust as a result of the multimodal, multi-cue probability function.

It should be understood that any of the examples herein are non-limiting. For example, while RGB (red, green blue) color component data is described, data based upon other color schemes such as CMYK typically used in printing or 3D printing may be used. Further, not all exemplified modalities may be present in a given configuration. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in segmentation and/or image processing in general.

Figure 1:
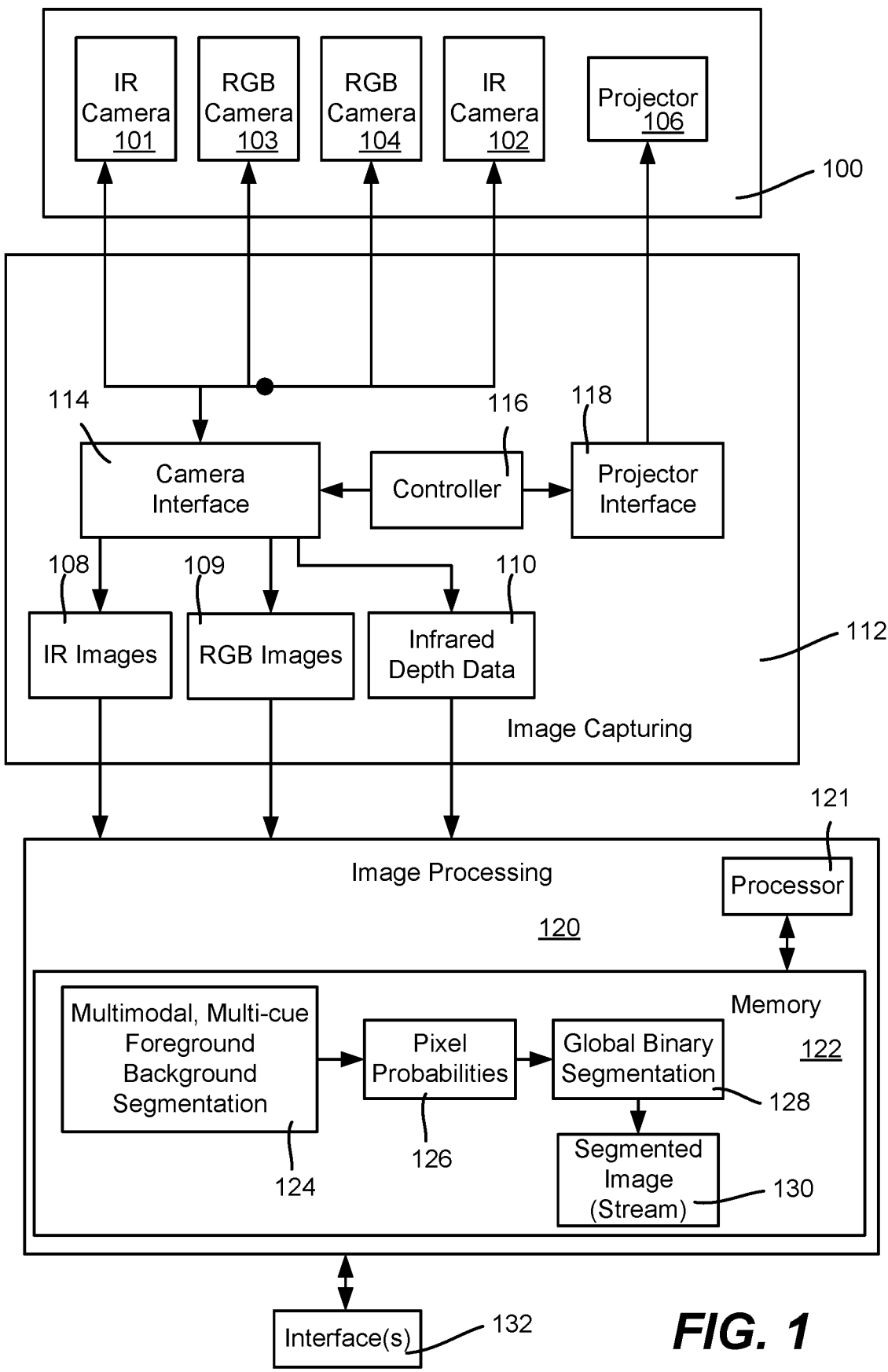
FIG. 1 is a block diagram representing example components that may be used to perform multimodal foreground background segmentation, according to one or more example implementations.

FIG. 1 shows an example system in which a pod 100 comprising stereo IR cameras 101 and 102, stereo RGB cameras 103 and 104, and a projector 106 (e.g., an IR laser diffracted into many thousands of dots) captures one or more frames of stereo (e.g., clean) IR images 108, RGB images 109 and depth data 110 (e.g., stereo images of the projected light pattern). Single images may benefit from the technology described herein, but generally a stream of images is processed for segmentation.

Note that the exemplified pod 100 is only one example arrangement, and that in other arrangements, the cameras 101-104 may be arranged in any order relative to one another. Indeed, in one implementation the projector is positioned above the cameras. Further, any of the cameras and/or the projector may be separated from one another, rather than being part of any pod configuration; no pod is needed. Thus, FIG. 1 is only showing components for purposes of explanation, and no scale, relative dimensions, relative positions, combinations of devices within a housing/pod device and so on should be inferred from FIG. 1.

In the example of FIG. 1, the pod 100 is coupled to (or combined with) an image capturing system or subsystem 112. The stereo cameras 101 and 102, and 103 and 104 are generally controlled, e.g., via camera interface 114 and controller 116, to capture stereo images synchronized in time (e.g., the cameras are "genlocked"). In one implementation the cameras 101 and 102 capture infrared (IR) depth data 110, as IR is highly effective in depth estimation in varying light conditions and does not affect the visible appearance of the scene. As can be readily appreciated and as exemplified below, in some scenarios such as studio environments, more than one such pod and image capturing system/subsystem may be present.

In FIG. 1, a projector 106 is shown that projects an IR pattern onto a scene, such as a pattern of spots (e.g., dots) or a line pattern, although other spot shapes and/or pattern types may be used. For purposes of brevity, dots are generally described hereinafter. By illuminating the scene with a relatively large number of distributed infrared dots, the IR cameras 102 and 103 capture texture data as part of the infrared depth image data 110. Note that the projector 106 is shown as coupled to the controller 116 via a projector interface 118; any such control may be as simple as turning the projector on and off or using energy saving modes, however more complex control such as pulsing, changing dot distribution, changing intensity and/or the like is feasible.

The images 108-110 captured by the cameras 101-104 are provided to an image processing system (or subsystem) 120. In some implementations, the image processing system 120 and image capturing system or subsystem 104, or parts thereof, may be combined into a single device. For example a home entertainment device may include all of the components shown in FIG. 1 (as well as others not shown). In other implementations, parts (or all) of the image capturing system or subsystem 104, such as the cameras and projector may be a separate device that couples to a gaming console, personal computer, mobile device, dedicated processing device and/or the like, which may include some or all of the image processing functionality.

The image processing system or subsystem 120 includes a processor 121 and a memory 122 containing one or more image processing algorithms, including a multimodal, multi-cue foreground background segmentation algorithm 124 as described herein. In general, the segmentation algorithm 124 outputs a set of per-pixel probability data 126, representative of whether each pixel is likely to be a foreground or background pixel. The pixel probability data 126 is input into a global binary segmentation algorithm 128 (e.g., a Graph Cuts algorithm), which uses the pixel probability data 126 as a data term to segment the image into a segmented image 130, e.g., the foreground only as part of a stream of segmented images. The stream of images 130 is generally used by another internal or external image processing component, such as for special effects.

Also shown in FIG. 1 is an interface 132 to the image processing system or subsystem 120, such as for connecting a keyboard, game controller, display, pointing device microphone for speech commands and/or the like as appropriate for a user to interact with an application or the like.

Figure 2:
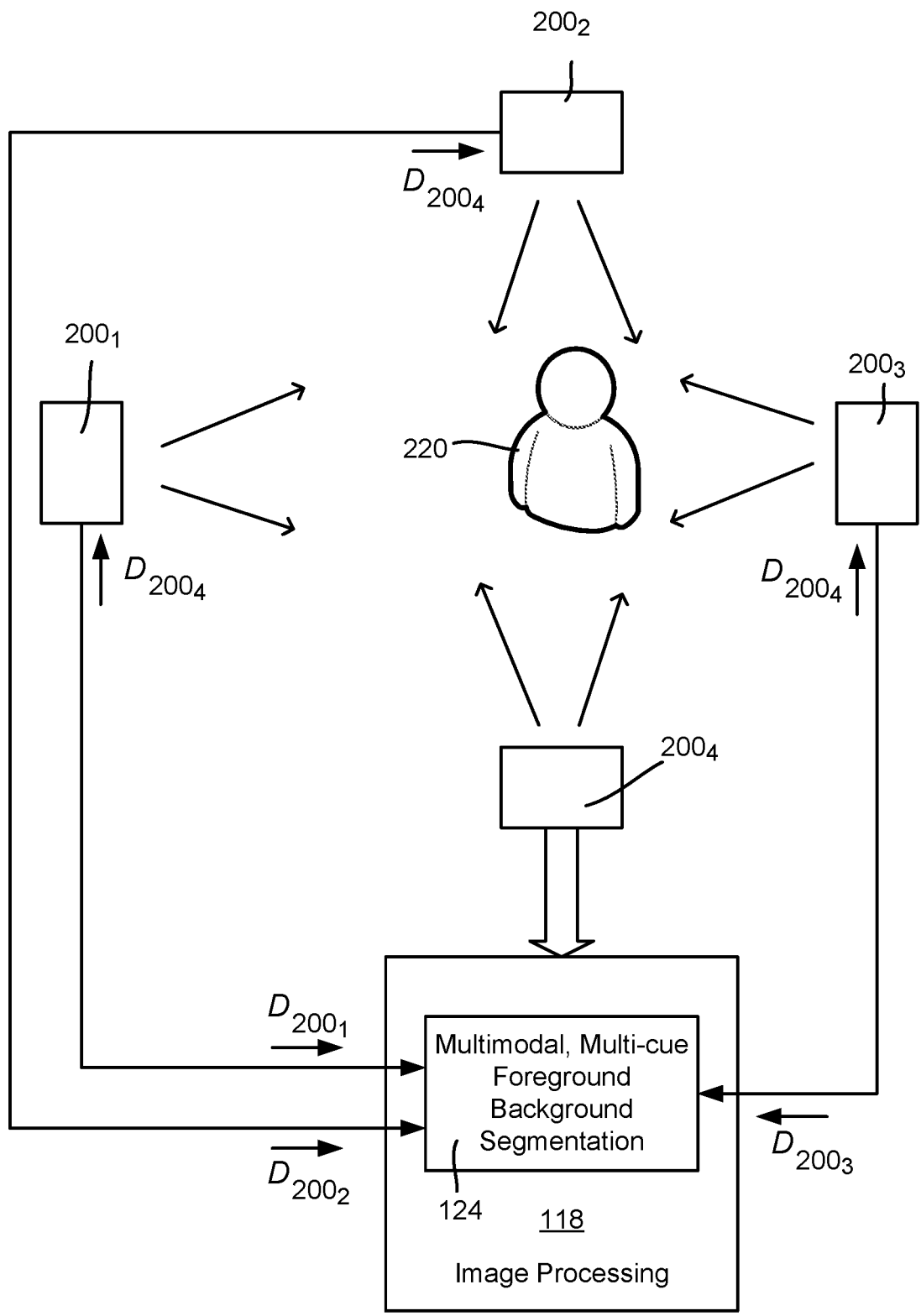
FIG. 2 is a representation of how a multimodal segmentation framework may be used in a multiple camera set scenario, according to one or more example implementations.

FIG. 2 shows a plurality of pods $200_1$-$200_4$ arranged to capture images of an object (e.g., a person) from different perspectives. Note that while four such pods are depicted in FIG. 2, it is understood that any practical number may be present in a given configuration. For example, one such studio-like configuration uses nine pods, with two sets of four pods at different heights surrounding a space plus one pod above the space.

In the example of FIG. 2, the IR and RGB image data captured from each of the four (or more) pods may be used to form an RGB point cloud and an IR point cloud. The point cloud data may be based upon the foreground data segmented into the image 130 (FIG. 1), e.g., by combining the foreground image 130 with a similar foreground image segmented based upon the data captured at each pod.

As generally represented in FIG. 2, the projectors capture IR and RGB images of a foreground object, e.g., person 230, (as well as the background) at each pod. Further, each pod may project the light pattern (IR dots) onto the scene. The reflected IR light is captured at each pod $200_1$-$200_4$, as the depth data image, and may be used via known stereo matching techniques to determine a depth map.

Figure 4:
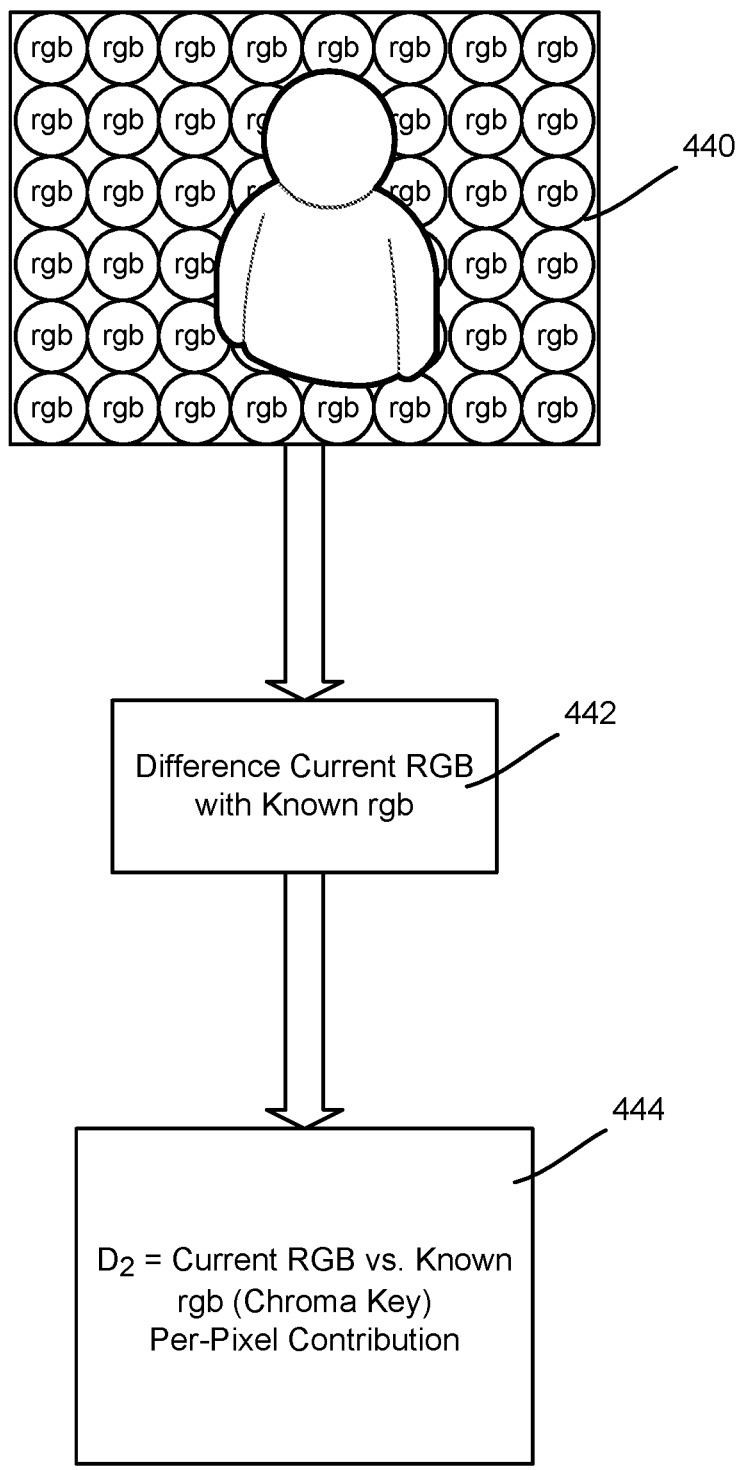
FIG. 4 is a representation of how a chroma keying modality may be used to obtain a contribution factor related to foreground versus background pixel data, according to one or more example implementations.

Note that each pod may have its own image processing system, or the pods may feed images to a centralized image processing system. In the former configuration, any data related to segmentation, e.g., the pixel probability data, may be communicated among the image processing systems, such as represented in FIG. 4 by data $D_{200_1}$-$D_{200_4}$ being sent to and from the image processing system 120. In the latter (centralized) configuration, the probability of each pixel for each pod is known in one location. The use pixel probability data corresponding to other pods is described below.

The multimodal, multi-cue foreground background segmentation algorithm 124 provides a framework for combining the contributions of different color separation mechanisms that are available in a given scenario. These include any contribution ($D_1$) obtained via chroma keying, any contribution ($D_2$) obtained via RGB background subtraction, any contribution ($D_3$) obtained via IR background subtraction, any contribution ($D_4$) obtained via distinguishing a frame's depth values from previously captured background depth value, and any contribution ($D_5$) obtained via prior knowledge of the background (e.g., known background depth). In one implementation these contributions may be weighted relative to one another and summed, whereby the order of computing such contributions is irrelevant.

Note that the contributions are determined per pixel for the images obtained by a camera set, e.g., two stereo RGB and IR cameras per set). However, it is feasible to compute the contributions at different level (e.g., sets of two-by-two pixels, and so on; note that depth can be estimated at sub-pixel levels as well). Thus, as used herein, pixels are exemplified, however "element" represents one pixel, a set of two or more pixels, and/or one or more sub-pixels that are used to obtain the contribution of each individual segmentation mechanism/modality, even if an element is different for a different segmentation mechanism/modality. Notwithstanding, individual pixels are the elements in one implementation, and thus used hereinafter as a typical example.

A suitable computation for determining a pixel's probability of being foreground or background is:

$$D=e^{(D_1+D_2+D_3+aD_4+aD_5)}.$$

Note that the value may be normalized such as to be between zero and one, e.g., with closer to zero meaning the more likely a background pixel (or vice-versa).

As set forth above, these contributions may be individually weighted:

$$D=e^{(vD_1+wD_2+xD_3+yD_4+zD_5)}.$$

Alternatively, some of the weights may be grouped or set to one, e.g., the depth-related factors may have a different weight or weights (e.g., the same weight a for depth, which may be a fractional value) from the non-depth factors, e.g.:

$$D=e^{(D_1+D_2+D_3+aD_4+aD_5)}.$$

Note that any of the weight values (including the above depth weight a) may be user configurable with a default if not chosen by a user. Alternatively, sets of weights may be provided for different scenarios, e.g., one weight set for dim visible light, another weight set for bright visible light, and so on.

In the framework, a weight or a contribution may be set to zero, such as if no contribution is available. For example, chroma keying may not always be available for a scenario, and/or or for a particular pod among many pods, such as in a studio setup.

Further, even if present, the weights need not be the same between pods. For example, a pod facing a greenscreen "straight on" may have a stronger ($D_2$) chroma keying weight than a pod that captures the greenscreen at an angle. A stereo camera that computes depth data via stereo differencing using IR illumination may be given a higher weight a for $D_4$ and $D_5$ computations, for example, than a time-of-flight depth camera. The weights for a given camera set or pod may be learned and calibrated on a per-camera set/pod basis.

Different sets of weights may be used based upon different conditions. For example, as visible light gets dimmer and dimmer, more and more weight may be given to infrared-based contributions, e.g., $D_3$, $D_4$ and $D_5$ than in bright light. The framework thus may be adapted to whatever external decision such as lighting decision is used to select parameters for the weights, the capabilities of the cameras, scenarios such as whether a greenscreen may be used for a given camera, and so on.

Figure 3:
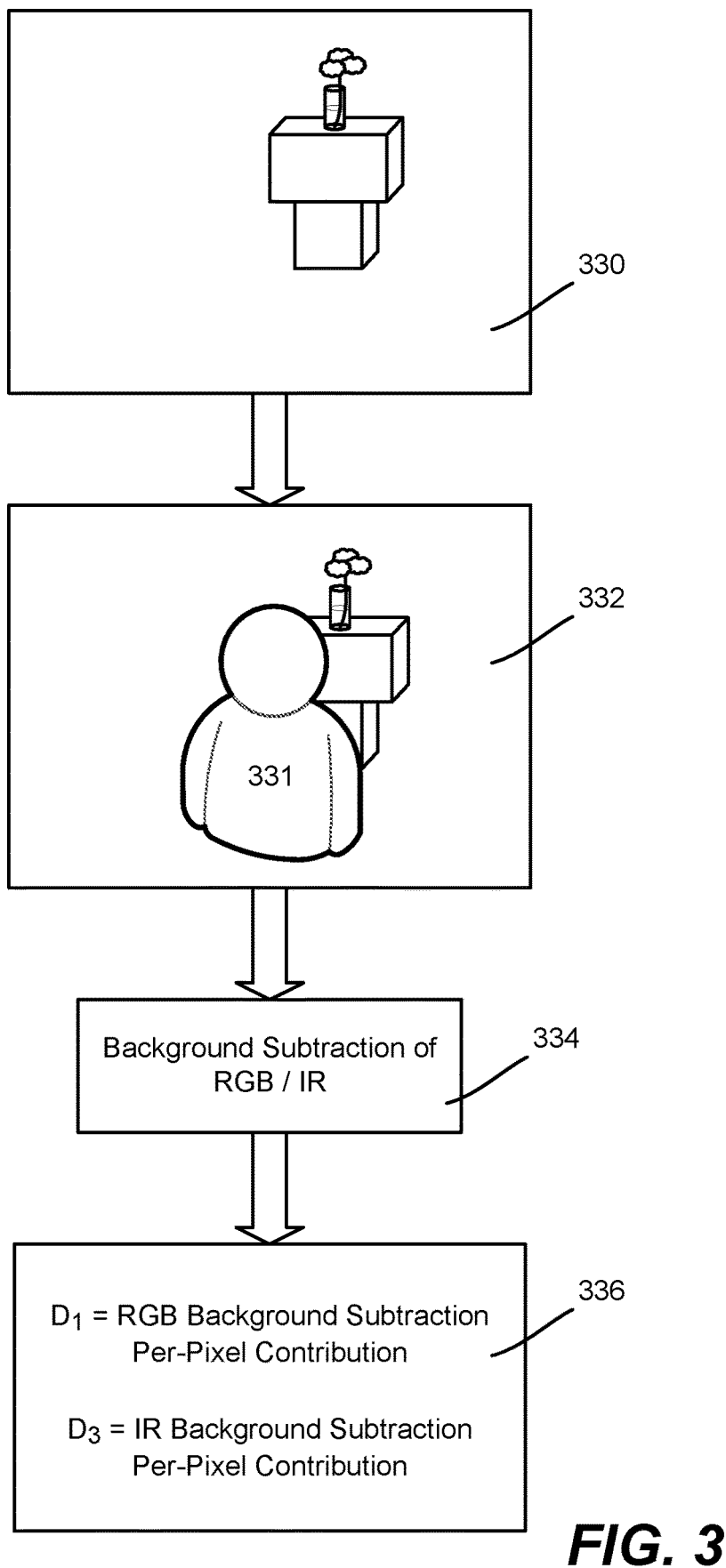
FIG. 3 is a representation of how RGB and infrared background subtraction modalities may be used to obtain contribution factors related to foreground versus background pixel data, according to one or more example implementations.

FIG. 3 shows how the contributions $D_1$ and $D_3$ may be obtained based upon background subtraction. An initial RGB background image is captured, as well as an initial (e.g., clean) IR background image and a depth image for processing into depth data, provided the appropriate cameras are available. Rather than capturing one image per type, it is appreciated that these may be sets of stereo images. Block 330 represents any or all of these possibilities.

When a foreground object 331 is captured in a current frame (represented by 332), the same types of images are captured, RGB, IR and depth, which may be stereo images. Note that "current" refers to the frame being processed for segmentation, and need not be a frame of "live" video. For viewability purposes, the blocks 330 and 332 in FIG. 3 shows one visible image as an example, but it is understood that blocks 330 and 332 also represents any IR image and depth imaging data, as well as stereo images for each.

Background subtraction of RGB is a well-known technique, and may be used with IR as well. Thus, by performing background subtraction 334 with the before (only background) and after (background plus foreground) RGB images, which may be on more than one before-and-after set (such as in the case of stereo) the contribution factor $D_1$ is obtained for each pixel. Similarly, background subtraction 334 is performed on the before and after IR images to obtain the contribution factor $D_3$ for each pixel.

The values for $D_1$ and/or $D_3$ need not be binary "foreground or background" results 336, but may be a value that indicates some uncertainty. For example, if a pixel being evaluated known to be in an area where the foreground and background are similar and/or blurry (e.g., as determined by a previous path-type processing algorithm), a value between zero and one may be the result, for example; indeed, an entire patch of pixels can be classified as uncertain. A pixel in a blurred area may have one value that differs from a value for a pixel in an area deemed similar, which may differ from an area that is deemed both blurry and similar. Blur and similarity areas (or other uncertain areas) may be determined via the IR and/or RGB images, or a combination of both, and possibly even by processing the depth image. As can be readily appreciated, the uncertainty reduces the factor's contribution to the other factors (independent of other weighting).

FIG. 4 shows the use of chroma keying to obtain this factor's $D_2$ contribution. In FIG. 4 the a priori known values, e.g., of a greenscreen are represented as lowercase rgb (to distinguish from the current frame's RGB, represented in uppercase), and in general may be the same throughout the entire background, but may differ if desired, as long as each background pixel's color values are known. Note that in block 440 the pixels behind the foreground object 441 are significantly smaller than represented, and block 440 is not intended to convey any sizes, relative sizes, number of pixels and/or the like.

Block 442 represents chroma key separation, with the result represented in block 444. As with other decisions, the result need not be a binary foreground or background decision, but may include uncertainty. For example, if a pixel's RGB values are close to what the background pixel value is known to be, but not exact, then the $D_2$ value may represent this uncertainty, because it may be the background changed slightly caused by differences in lighting/reflection off of the foreground object, or may be caused by a foreground object having a similar color, e.g., a human is wearing a necktie with a pattern that includes some closely colored material. Again, this is not as significant as with chroma key separation alone, because the $D_2$ value at any pixel is only one contributing factor to the framework.

Note that the framework processes the same stream of data per image type, e.g., the RGB data only be captured once per camera frame to be used with RGB processing mechanisms (background subtraction and chroma keying) described herein.

Figure 5:
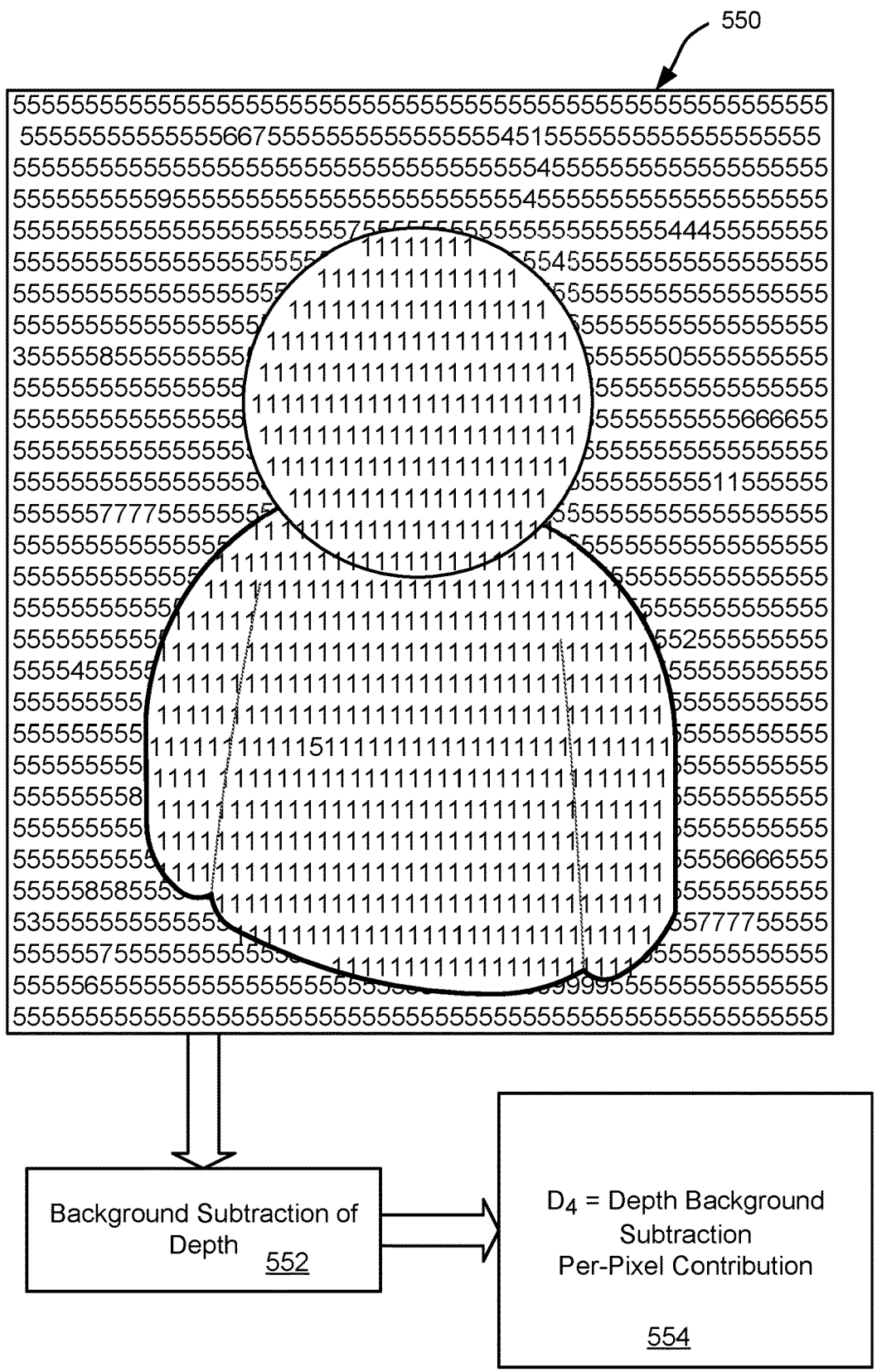
FIG. 5 is a representation of how current image depth data versus known background depth data may be used to obtain a contribution factor related to foreground versus background pixel data, according to one or more example implementations.

FIG. 5 shows how the (current computed depth with previously captured/computed depth) $D_4$ factor may be obtained by "background depth subtraction" 552, namely by comparing current foreground depth values (represented symbolically by "1" in block 550 against previously captured background depth values represented by various other single digit numbers. Note that some errors/noise may occur, e.g., there are some "1s" in the background and a "5" in the foreground. However, $D_4$ is only one contributing factor rather than a determinative one, and thus such noise ultimately may be insignificant. Some level of uncertainty also may be indicated by a non-binary value, e.g., if the difference appears as an outlier compared to other pixels' differences, possibly in a patch-based scheme.

Figure 6:
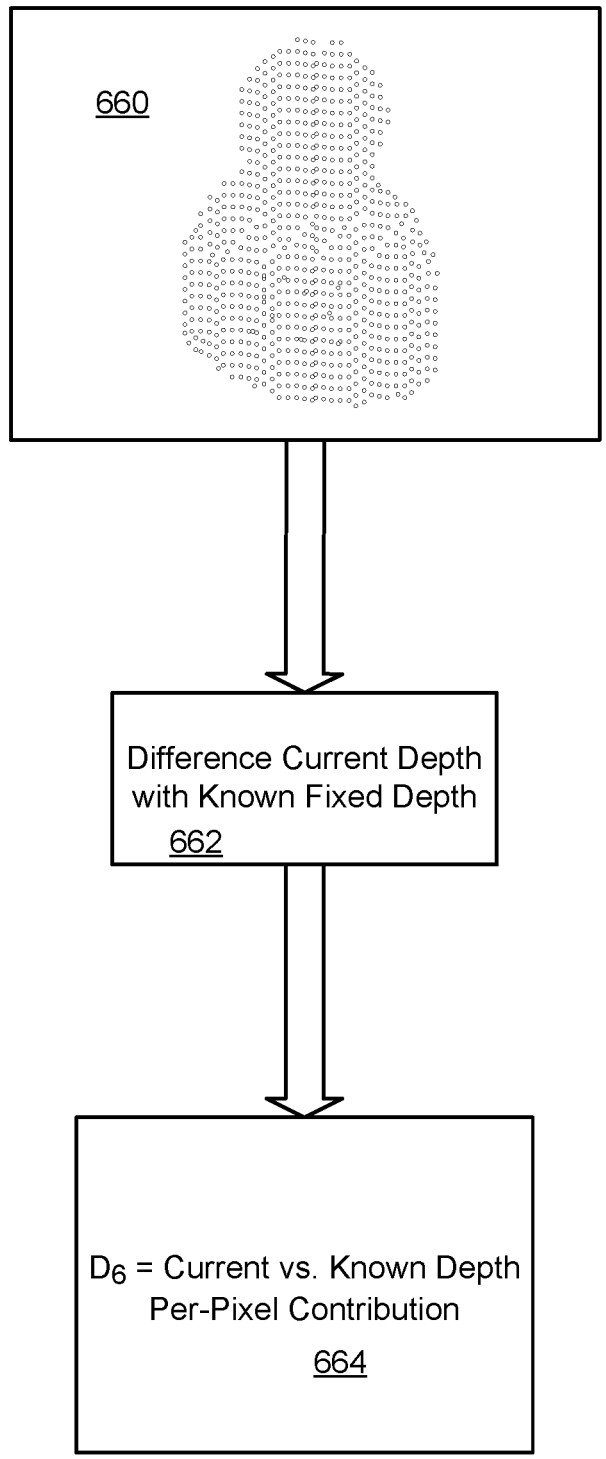
FIG. 6 is a representation of how current image depth data versus threshold depth data may be used to obtain a contribution factor related to foreground versus background pixel data, according to one or more example implementations.

FIG. 6 shows the use of depth data (block 660) against a known, fixed depth or threshold to make a decision (block 662) that becomes the $D_5$ result (block 664). For example, a studio may be set up such that a person is instructed to stand within 4.0 meters relative to a camera location. Any depth captured over 5.0 meters is considered background during the per-pixel processing. Again, there may be noise, but $D_5$ is only one contributing factor. Further, as with other decisions described herein, an "uncertain" decision may be indicated in the result (block 664), be present in the value, e.g., a pixel at 4.5 meters may be considered uncertain. Te actual value may be indicative of the uncertainty, e.g., a score between zero (0) and one (1) that is proportional to the computed difference between 4.0 and 5.0 meters.

Figure 7:
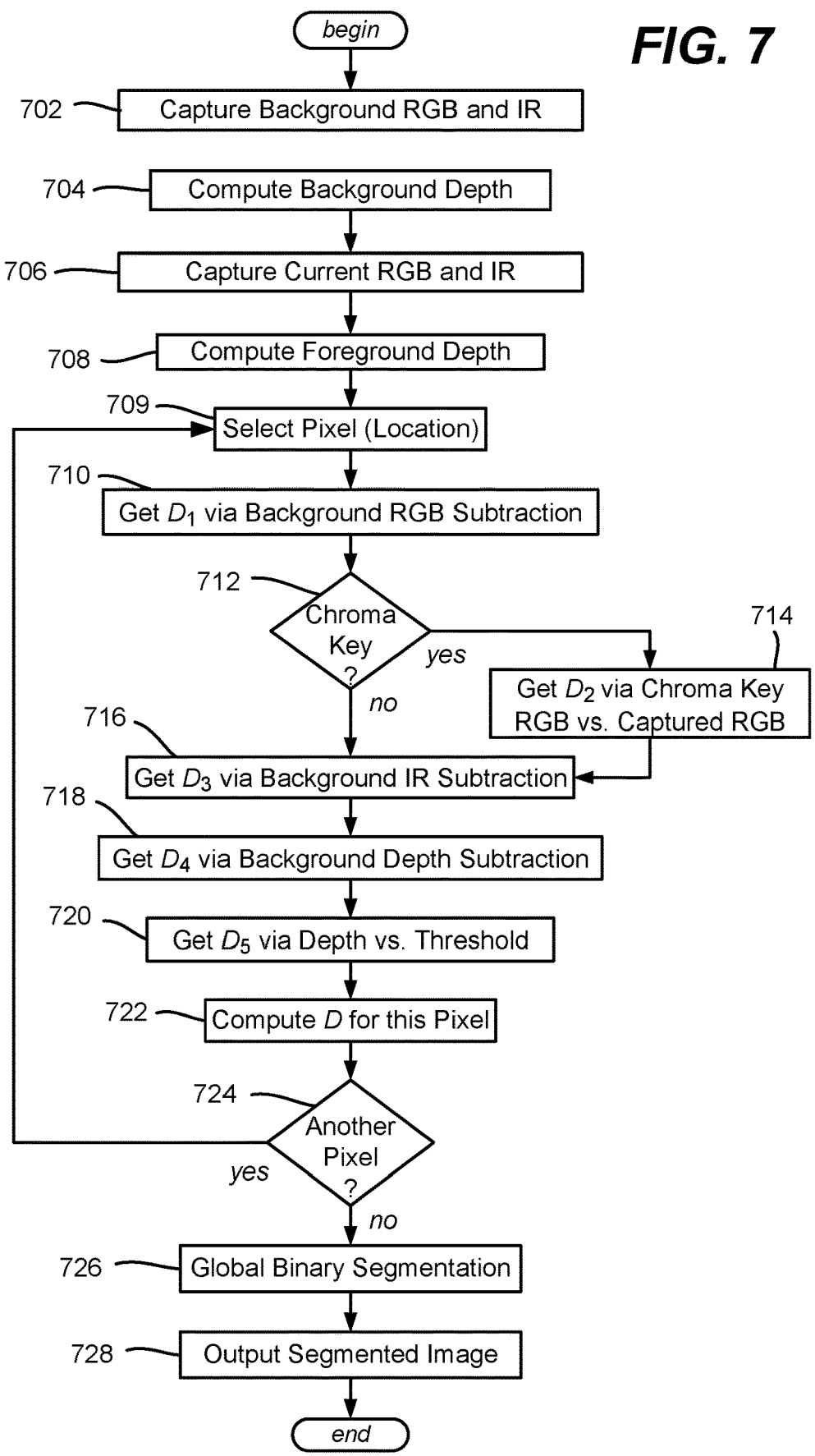
FIG. 7 is a flow diagram showing example steps that may be taken by a framework to combine various modality inputs into segmentation-related data according to one or more example implementations.

FIG. 7 is a flow diagram showing example steps that may be taken to obtain the contributing factors and use them for segmentation. Step 702 represents capturing the background information, including RGB, IR (e.g., clean IR) and depth (IR with projected light pattern) images. Step 704 computes the background depth.

Sometime later, a foreground image is captured for segmentation. Step 706 captures the current frame of RGB and IR (e.g., clean and for depth) images. Step 708 computes the current depth.

Step 709 selects a pixel (e.g., the relevant pixel values at the same pixel location in each of the three images). Step 710 uses the current RGB values at this pixel location to get D1 via background subtraction with a counterpart pixel in the background RGB image.

Step 712 represents determining whether chroma-keying is active; if so, step 714 gets the D2 contribution factor value. If not, e.g., there is no greenscreen for this camera set, whereby the $D_2$ value (or the corresponding weight) may be set to zero in the framework so there is no contribution from this modality. Note that any of the other modalities similarly may not be active, in which event the contribution for such a modality may be set to zero for all current pixels corresponding to that modality; however the chroma key active versus inactive modality is used as an example in FIG. 7 because this modality is likely quite variable in many scenarios. Indeed, even in a carefully controlled multi-camera studio environment, a greenscreen may not entirely surround a foreground object, whereby one or more cameras may not have chroma keying active.

Steps 716 and 718 use IR background subtraction on the corresponding background only and background plus foreground IR image and "depth background subtraction" on the corresponding background only and background plus foreground depth data, respectively. This provides values for the $D_3$ and $D_4$ contributions.

Step 720 is the measured current depth versus "threshold" depth evaluation to obtain a D5 value for this pixel, as described above. At this time, the contributing factor values are obtained for this pixel, which are computed into the pixel probability value D, as described above.

Step 724 repeats for the next pixel (location) in the images. Note that in one implementation, any of steps 709-724 may be done in parallel with similar steps performed on another pixel or pixels. Note that some of the steps may be performed in GPU hardware, which is highly parallel.

When the pixels each have a respective D probability, at step 726 this data may be fed as data terms into a graph cuts algorithm (with an attractive potential for the smoothness term of Graph Cuts used) or another global binary segmentation technique (e.g. maximum likelihood graphical model, Markov random field and so on). The output segmented image can either be a binary segmentation into foreground/background, or a soft boundary, in which edge pixels can be partially in the foreground/background (e.g., alpha matting techniques). At step 728 the segmented image may be output as part of a stream, for example.

Figure 8:
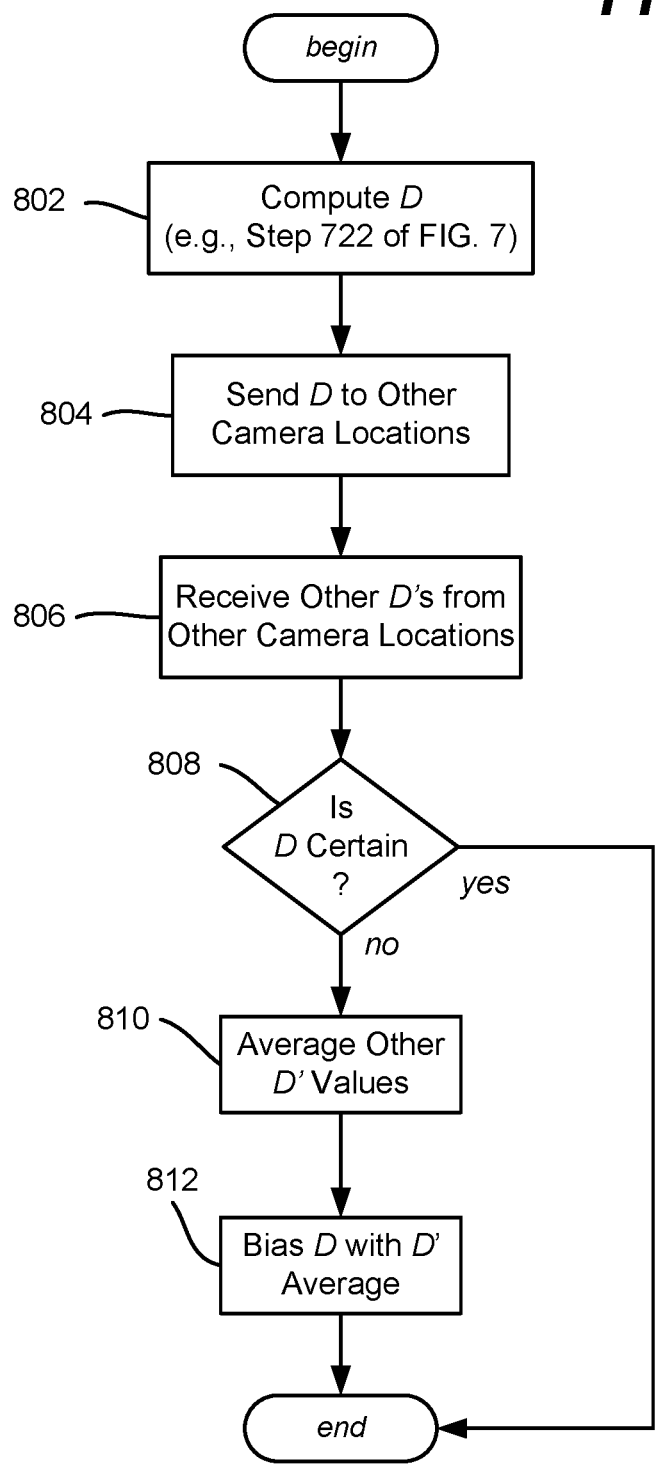
FIG. 8 is a flow diagram showing example steps that may be taken to use segmentation-related data corresponding to one or more other cameras to compute segmentation-related data of a camera, according to one or more example implementations.

Turning to another aspect, generally represented in FIG. 8, as set forth above knowledge about a pixel from one or more other cameras (including the other half of a stereo pair or an entirely different camera set) may be known and used as part of the current pixel processing. For example, consider that a given pixel has a highly uncertain probability value, such as close to 0.5 (halfway between background and foreground). Another camera with a different angle and possibly additional information (e.g., the other camera had chroma keying active, while the one with the highly uncertain probability value did not) may have a far more certain probability, e.g., 0.9. This information may be used to change or bias the uncertain probability value to a more certain value. Note that instead of providing the D value, another camera can provide its full set of D1-D5 values, or some lesser set thereof. However, depth information is needed at each other camera to leverage one or more other cameras' data.

One way the use of such other information may be accomplished is by using the other information (e.g., the computed D probability) as another contributing factor, e.g., as a "D6" value, with an appropriate weight. There may be one other factor per other camera pixel, e.g., D6, D7, D8 and so on, or one or more may be combined; these other cameras may have their other information combined into as little as one single additional contributing D6 factor, for example. However, this means that there is an initial D probability used by others, because a final D value is not yet known until each other's probability information is obtained.

Thus, the process may be iterative, as the D value corresponding to one camera may change the D value corresponding to another, which then may change the other one, and so on. The iterations may be limited for practical reasons.

A simpler way is to use only the initial D values computed at each camera with another camera's D value, in some way that biases the initial D value. For example, consider for simplicity that there is only one other camera that provides D' as its initially computed probability. D' may be used once to possibly alter D, rather than iteratively.

FIG. 8 shows such an example, beginning at step 802 where the probability data D is computed for a current camera, (corresponding to step 722 of FIG. 7). This D value for this pixel is "sent" to other camera locations for their use (where "sent" in a centralized processing scenario refers to maintaining that value in association with each other camera's probability data. Step 806 "receives" the other's probability data (each a D' value) for use.

Steps 808, 810 and 812 represent one way the other D' values may be used. For example, if the local D is already certain above or below a threshold uncertainty range, then D is used as is. Otherwise via steps 810 and 812, D is biased with the average of the other D' values, or some other combination of the other D' values, e.g., a consensus. The bias may increase or decrease the initial D value, and may be weighted to reduce or increase the influence of the other cameras. These D' values from the other cameras may have different weights relative to each another so that all other cameras need not be treated equally.

As can be readily appreciated, there are numerous ways to use other camera data. For example, rather than (or after) biasing, an uncertain probability may be replaced by the most certain one among other probabilities, or replaced with an average or consensus thereof of multiple probabilities for this pixel, and so on.

Indeed, a given camera may not even have any of its images processed for segmentation, but rely on the data (e.g., probability data) computed from other camera locations. For example, consider that in FIG. 2 three of the four cameras capture a greenscreen in the background, capture infrared data and so one, while a fourth camera does not. Indeed, at an extreme, the fourth camera may be a simple RGB camera for which no previous background data or a priori background knowledge exists. Segmentation may be performed with this camera's images using only the foreground-background data corresponding to one or more other cameras.

Another aspect is image processing to detect information in the image as a whole or in patches. For example, as set forth above, blur and similarity detection may be employed. Other detection such as object recognizers may be leveraged. For example, often foreground objects are people (even if close to the background), whereby face/person detection may be used as another factor. Certain objects such as a company's commercial items while capturing a commercial advertisement may be recognized so as to bias them toward the foreground or force them into the foreground.

Example Operating Environment

Figure 9:
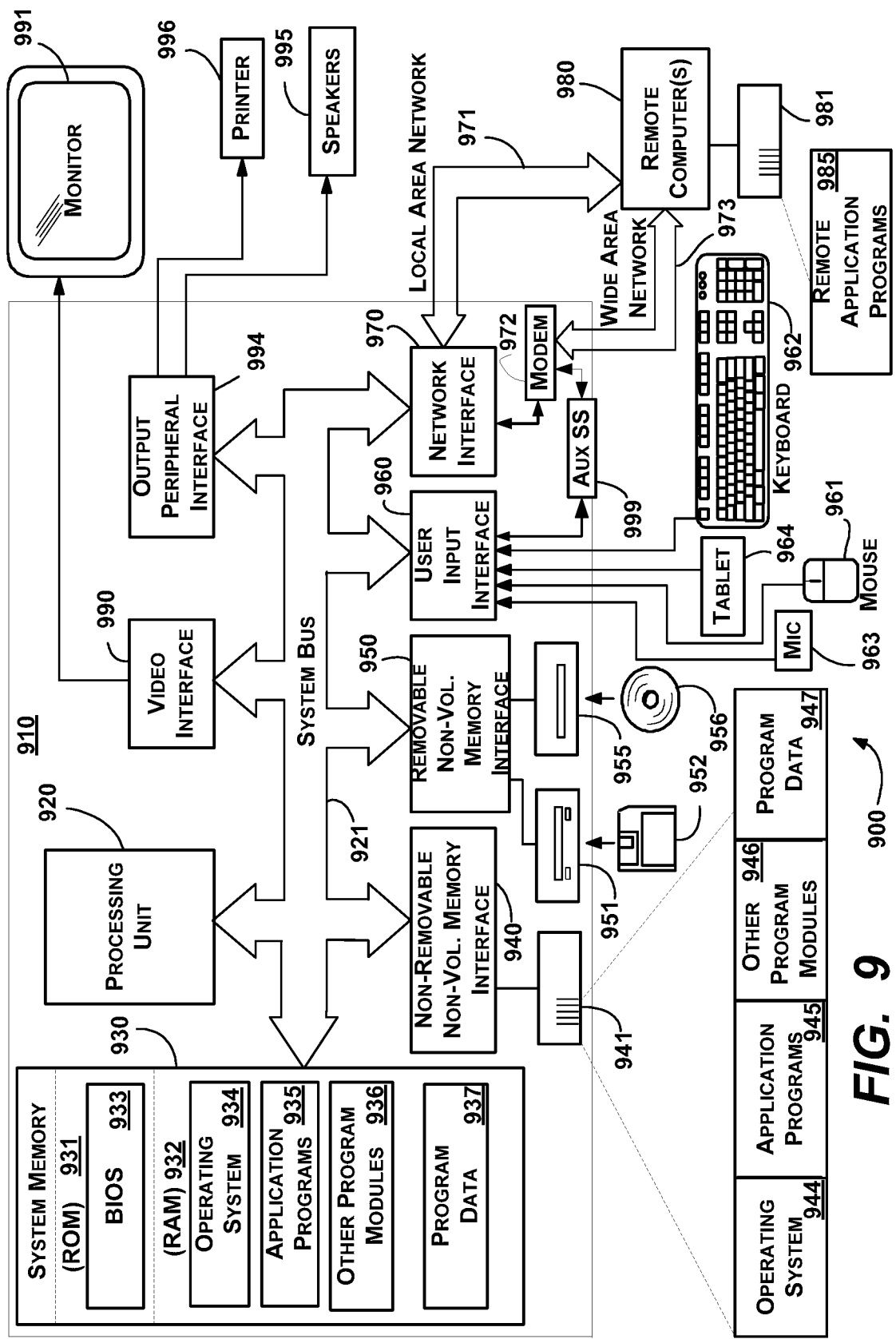
FIG. 9 is a block diagram representing an exemplary non-limiting computing system or operating environment into which one or more aspects of various embodiments described herein can be implemented.

FIG. 9 illustrates an example of a suitable computing and networking environment 900 into which computer-related examples and implementations described herein may be implemented, for example. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the example operating environment 900.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an example system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component 974 such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG.

9 illustrates remote application programs 985 as residing on memory device 981. It may be appreciated that the network connections shown are examples and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System on chip systems (SOCs), Complex Programmable Logic Devices (CPLDs), etc.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising,
a foreground background segmentation framework;
one or more image capture devices configured to capture a first red, green, and blue (RGB) image of a scene, a second RGB image of the scene, a first infrared (IR) image of the scene, and a second IR image of the scene;
one or more hardware processors programmed to:
for each pixel in the second RGB image, compute a first value comprising a difference between the second RGB image and a corresponding pixel in the first RGB image;
for each pixel in the second IR image, compute a second value comprising a difference between the second IR image and a corresponding pixel in the first IR image;
produce a first weighted value and a second weighted value by applying a first weight to the first value and a second weight to the second value, respectively;
combine the first weighted value and the second weighted value to determine for each element of the scene, whether a particular element is a foreground or background element.

2. The system of claim 1 wherein the first RGB image is captured by a first capture device and the second RGB image is captured by a second capture device.

3. The system of claim 1 wherein the second weighted value is greater than the first weighted value when a visible light level is below a threshold.

4. The system of claim 1 wherein the first weight and the second weight are based at least on a type of the one or more image capture devices.

5. The system of claim 1 wherein the one or more hardware processors are further programmed to process a frame of image data using chroma keying to obtain a chroma keying contribution factor for a particular element and using a contribution from the chroma keying contribution factor to determine for each element of the scene, whether that element is a foreground or background element.

6. The system of claim 1 wherein the foreground background segmentation framework is configured to select a weight set from among a plurality of weight sets to apply the first weight and the second weight to the first value and the second value, respectively.

7. The system of claim 1 wherein the foreground background segmentation framework is coupled to a multiple camera set environment comprising a plurality of image capture devices include the one or more image capture devices, and wherein the framework is configured to apply a weight set to one camera set that is different from a weight set applied to another camera set.

8. The system of claim 1 wherein the foreground background segmentation framework is coupled to a multiple camera set environment comprising a plurality of image capture devices include the one or more image capture devices, and wherein the one or more hardware processors are further programmed to determine whether the element is a foreground or a background element based on a contribution factor in conjunction with information that corresponds to other camera foreground versus background data.

9. The system of claim 1 wherein the one or more hardware processors are further programmed to process one or more of the first RBG image and the second RGB image by combining contributions of different color separation mechanisms comprising: chroma keying, RGB background subtraction, IR background subtraction, distinguishing a frame's depth values from previously captured background depth value; and prior knowledge of the background; and
wherein each contribution has a corresponding weight.

10. A method, comprising,
receiving a first red, green, and blue (RGB) captured image of a scene, a first infrared (IR) captured image of the scene, a second RGB captured image of the scene, and a second IR captured image of the scene;
for each pixel in the second RGB captured image, computing a first value comprising a difference between the second captured RGB image and a corresponding pixel in the first RGB captured image;
for each pixel in the second IR captured image, computing a second value comprising a difference between the second IR captured image and a corresponding pixel in the first IR captured image;
producing a first weighted value and a second weighted value by applying a first weight to the first value and a second weight to the second value, respectively;
computing a combined data term based at least in part upon combining the first weighted value and the second weighted value, and
using the combined data term in conjunction with other data terms as input to determine for each element of the scene, whether a particular element is a foreground or background element.

11. The method of claim 10 further comprising processing a frame of image data using chroma keying to obtain a chroma keying contribution factor, for the element and wherein computing the combined data term further comprises using a contribution from the chroma keying contribution factor.

12. The method of claim 10, further comprising determining one or more other depth-based contribution factors based upon depth data associated with each element, wherein determining the one or more other depth-based contribution factors comprises evaluating a difference between currently captured depth data corresponding to the particular element and previously captured background depth data corresponding to the particular element.

13. The method of claim 10, further comprising determining one or more other depth-based contribution factors based upon depth data associated with each element, wherein determining the one or more other depth-based contribution factors comprises evaluating currently captured depth data corresponding to the particular element and threshold depth data.

14. The method of claim 10 further comprising, using information corresponding to background versus foreground information corresponding to at least one other camera in computing the combined data term.

15. One or more machine-readable storage devices having executable instructions, which when executed perform steps, comprising:
   selecting a pixel as a selected pixel;
   processing pixel data, including:
      processing red, green and blue (RGB) pixel data of two or more captured images to determine one or more RGB contributing factors indicative of whether the selected pixel is likely a foreground or background pixel in a current image;
      processing infrared (IR) pixel data of one or more infrared captured images to determine one or more IR contributing factors indicative of whether the selected pixel is likely a foreground or background pixel in the current image;
      processing pixel depth data to determine one or more depth-based contributing factors indicative of whether the selected pixel is likely a foreground or background pixel in the current image;
   producing a first weight to the one or more RGB contributing factors and a second weight to the one or more RGB contributing factors and a third weight to the one or more depth-based contributing factors; and
   based at least on the processing and the first, second, and third weighted factors, determine whether the selected pixel is a foreground or background pixel in the current image.

16. The one or more machine-readable storage devices of claim 15 wherein processing the RGB pixel data of the two or more captured images to determine the one or more RGB contributing factors comprises performing at least one of: background subtraction based on a previous RGB background image and a current RGB image, or performing chroma keying based on known background data and the current RGB image.

17. The one or more machine-readable storage devices of claim 15 wherein processing the IR pixel data of the one or more images to determine the one or more IR contributing factors comprises performing background subtraction based on a previous IR background image and a current IR image.

18. The one or more machine-readable storage devices of claim 15 wherein processing the pixel depth data to determine the one or more depth-based contributing factors comprises performing at least one of: evaluating current pixel depth data against previous background pixel data, or evaluating current pixel depth data against threshold depth data.

19. The method of claim 10, wherein each element comprises a pixel.

20. The method of claim 10, further comprising outputting foreground versus background data for each element to a global binary segmentation algorithm.

* * * * *